US008825306B2

(12) United States Patent
Dankers

(10) Patent No.: US 8,825,306 B2
(45) Date of Patent: Sep. 2, 2014

(54) ANALYZING ROAD SURFACES

(75) Inventor: Andrew Alexander Dankers, Torrens (AU)

(73) Assignee: Honda Research Institute Europe GmbH, Offenbach/Main (DE)

( * ) Notice: Subject to any disclaimer, the term of this patent is extended or adjusted under 35 U.S.C. 154(b) by 0 days.

(21) Appl. No.: 13/606,553

(22) Filed: Sep. 7, 2012

(65) Prior Publication Data

US 2013/0085642 A1    Apr. 4, 2013

(30) Foreign Application Priority Data

Sep. 30, 2011 (EP) .................................... 11183423

(51) Int. Cl.
*B62D 6/00* (2006.01)
*G05D 1/00* (2006.01)
*B60T 7/12* (2006.01)
*G06F 15/00* (2006.01)

(52) U.S. Cl.
USPC ................................... 701/48; 701/1; 701/82

(58) Field of Classification Search
USPC .................................................... 701/48, 821
See application file for complete search history.

(56) References Cited

U.S. PATENT DOCUMENTS 5,652,655 A * 7/1997 Uno et al. ..................... 356/600

FOREIGN PATENT DOCUMENTS

| DE | 10314424 A1 | 3/2003 | |
| DE | 10314242 A1 * | 10/2004 | .............. B60T 8/172 |
| EP | 0412791 A2 * | 2/1991 | ......... B60G 17/0182 |
| EP | 1964736 A1 | 9/2008 | |
| EP | 2196792 A1 | 6/2010 | |

OTHER PUBLICATIONS

"Activity-Driven, Event-Based Vision Sensors", Delbrück, T., Linares-Barranco, B., Culurciello, E., Posch, C., May 30, 2010-Jun. 2, 2010, Circuits and Systems (ISCAS), Proceedings of 2010 IEEE International Symposium on, Paris France, pp. 2426-2429, 978-1-4244-5308-5.*
S. Paquis et al.; "Road Surface Classification by Thresholding Using Morphological Pyramid" 0-7695-0750-6/00; 2000 IEEE; pp. 334-337.
European Search Report issued in the corresponding EP application No. 11183423.0, dated Dec. 3, 2012.

* cited by examiner

*Primary Examiner* — Mary Cheung
*Assistant Examiner* — Brian P Sweeney
(74) *Attorney, Agent, or Firm* — Squire Patton Boggs (US) LLP

(57) ABSTRACT

The invention proposes a system that uses a novel method to analyze the surface being about to be traversed by a vehicle. The system can be used to enhance vehicle safety and control. The system makes use of AER cameras such as the Silicon Retina. The Silicon Retina is used monitor the surface to be traversed, and a processing unit analyzes the surface based on the signal provided by the Silicon Retina. The proposed surface analysis method carried out by the system surpasses state-of-art analysis methods.

22 Claims, 11 Drawing Sheets

ANALYZING ROAD SURFACES

BACKGROUND OF THE INVENTION

The present invention is directed to a system and method for analyzing a surface to be traversed by a vehicle. The system comprises an event-based vision sensor, and is adapted to analyze the surface. Depending on the analysis one or more of the following actions can be triggered:

- control an actuator (brakes, steering, accelerator) of the vehicle,
- indicate the result of the analysis, e.g. visually, haptically (vibrations etc.) and/or acoustically,
- adjust parameters (e.g. initiating safety devices like airbag, ABS etc.) of the vehicle based on a detected change of surface properties (events) of the monitored surface.

Hazardous surfaces are involved in numerous traffic accidents. For example, the Australian Road and Traffic Authority (RTA) reported that between 2004 and 2008 hazardous surfaces were involved in around 18% of all traffic accidents, and 23% of all accidents that take place in curves. Hazardous surfaces are formed by loose gravel, pot holes, oily surfaces and the like.

In particular traction loss is a factor in 20% of wet road car accidents and even 34% of wet road motorcycle accidents. Accident statistics sampled from around the world and driver opinion clearly identify a lack of 'grip' as one of the most important issues for vehicle drivers, in particular for motorcycle and scooter riders. Surface conditions are one of several major sources of danger.

STATE OF THE ART

Existing traction control systems (TCS) and automatic braking systems (ABS) are commonly used to estimate properties of the surface that is being or has been traversed by a vehicle. In response to the surface estimation, corrective reactions can be executed. Often, however, the estimation procedures that are involved in traction analyses require that the tires of the vehicle temporarily lose traction with the traversed surface. In particular for motorcyclists this is not a desirable solution. The solution also requires that a surface has been traversed, before vehicular reactions can be initiated.

Other state of the art road surface analysis systems and methods comprise amongst others the following.

A direct contact friction measurement system (e.g. http://www.asft.se) can be used to monitor runway and road friction via a dragged device in contact with the surface. The system is available embedded in vehicles, or as a separate hauled device. However, systems designed to contact a surface for direct traction and/or surface measurements incorporate parts that wear out, need replacement, affect the dynamics of the vehicle, add mass and expense, and cannot observe the surface in front of vehicle that is to be traversed. The systems do not provide any information on the surface type or the surface structure.

Different water, snow and ice detection system exist (e.g. http://www.vaisala.com/en/products/surfacesensors/Pages/default.aspx). They are typically stationary (road-side) commercial systems. The systems are used to measure the presence of water, snow, and ice on sections of road and bridges for traffic management purposes. They operate e.g. based upon active transmission of an infrared light beam directed onto the road surface with the detection of backscattered light at selected wavelengths. Most of the backscattered light will have traversed a surface layer of water or ice present on the surface. Through a proper selection of the receptive wavelengths it is possible to observe the absorption of water and ice practically independent of each other. However, the systems do not yield information related to dry conditions and surface types.

Systems to analyze the road structure have been proposed as well. Such systems can e.g. be based upon a combination of a camera and laser sensors. Such systems can incorporate non-contact surface analysis below the front of the vehicle. Laser array systems designed to estimate road structures are, however, cost-prohibitive and bulky.

Traction Loss detection methods like accelerometer or slip methods are common in modern vehicles. They are commonly incorporated in TCS/ABS systems (see e.g. (http://en.wikipedia.org/wiki/Anti-lock_braking_system and http://en.wikipedia.org/wiki/Traction_control_system).

However, these systems typically require the vehicle to slip, so are inherently suboptimal. Systems that rely on detecting different wheel rotation velocities are also suboptimal, because they rely on at least one wheel retaining traction, meaning not all wheels can be controlled by the ABS during braking or by the TCS during acceleration.

The Ducati Moto GP race system (Ducati/Ferarri race TCS) is an example for a system that intends to never allow a wheel to break traction. The system is, however, not predictive or forwards-looking, is not an online closed loop measurement system, and does not provide high detail.

Numerous mitigations systems for handling and safety exist to enhance vehicle control and safety by modifying power delivery, suspension, etc. according to driver selection. However, few incorporate automatic, continuous, tuned adjustment according to road surface conditions, in a manner that does not distract the driver.

Finally, computer vision techniques have been used to classify road surface appearance with RGB cameras, for example for a map database construction (e.g. Paquis, S. et al., *Road Surface Classification by Thresholding Using Morphological Pyramid*, ICPR 2000). Such methods use a static image of the road surface captured using a stationary digital camera. Onboard visual surface classification methods are, however, rare to non-existent, likely due to road surface imaging problems with traditional camera sensors at speed and with rapidly varying surface appearance.

Furthermore, onboard vision systems are not known to analyze the road surface for traction and hazards immediately in front of a moving vehicle. There is no apparent evidence suggesting the existence of a visual system capable of 'day and night' and/or 'wet and dry' operation.

TARGET OF THE INVENTION

The primary target of the invention is to improve the existing prior art, specifically in respect to the above-mentioned drawbacks. In particular, the invention intends to analyze the surface, which a vehicle is about to traverse, in order to estimate or to predict properties of the surface, such as surface type, the tire-surface traction, and/or the surface structure.

The invention aims to provide a system and method that can detect traction and/or structure events in the surface to be traversed, and to automatically accommodate for traversal of such detected or predicted surface structure events, or to prevent a traction loss. Traction loss is a degradation of traction between the tire and the surface, which occurs when the velocity of the tire at the tire-surface contact point exceeds the maximal tire velocity at the tire-surface contact point corresponding to the maximal vehicle acceleration. Typically, traction loss occurs when the tire velocity at the tire-surface contact point is beyond 10-15% of the vehicle velocity, depending on the tire and surface properties and conditions.

A solution to the objective problems would be to provide by a system that involves a sensor directed at the surface to be traversed, permitting analysis of that surface. Sensors that have previously been used for surface analysis and traction control include laser, sonar, conventional frame-based cameras, gyroscopes and accelerometers, radar, acoustic sensing etc.

In general, conventional cameras have not been not used as sensors for an on-vehicle road surface analysis (an exception is given by Paquis, S. et al., *Road Surface Classification by Thresholding Using Morphological Pyramid*, ICPR 2000, but it operates on a static image captured under controlled conditions, not on a moving vehicle).

A problem for using conventional cameras is that with relatively long global frame exposure times the road surface blurs across the image. With faster exposure times the image is underexposed and/or noisy. Additionally, problems may occur where the intensity contrast or illumination of the road changes rapidly with the vehicle motion, for instance where white lane markings are present on dark asphalt, or when the surface appearance changes. In these circumstances, conventional cameras may produce underexposed or saturated images of the surface event, because camera exposure control requires a measurement and adjustment period, in which the surface event being traversed may be imaged poorly, or is passed without being captured usefully, due to image saturation or underexposure.

The present invention therefore proposes that an event-based camera sensor such as the Silicon Retina (see US 2008/0135731 A1) may advantageously be used for visual road surface analysis in combination with novel algorithms. Event-based vision sensors have not been previously utilized in road surface analysis, and are herein identified as being beneficial sensors for such purposes. For example, the Silicon Retina produces data that is in the so called Address Event Representation (AER) format (http://www.ini.uzh.ch/~tobi/papers/nipsCAVIAR2005.pdf), and not in a traditional camera frame format. Therefore, new algorithms may or must be utilized, which may not be compatible with conventional camera frame-based data.

The present invention thus proposes a novel method to analyze the surface being about to be traversed by a vehicle, such that vehicle safety and control may be enhanced. The invention shows that AER cameras, such as the Silicon Retina, are advantageous for this task. The invention demonstrates how the proposed surface analysis method surpasses any state-of-art analysis methods.

SUMMARY OF THE INVENTION

The present invention is directed to a system for analyzing a surface to be traversed by a vehicle, wherein the system comprises at least one event-based vision sensor for monitoring the surface to be traversed, and a processing unit for analyzing the monitored surface based on a signal provided by the at least one event-based vision sensor. For example, in the analyzing step the processing unit can classify the monitored surface (i.e. distinguish between different classes of surfaces). The determination of the monitored surface based on the event-based vision sensor can also be used for traction interference (without binning the monitored surface into classes first). Therefore, an analogue system output is useful. One example, for which an analogue output is measured, is an analysis or determination of the density of the monitored surface based on the signal provided by the event-based vision sensor. A determination of the density will be described later.

An event-based vision sensor is a camera that senses illumination or contrast events (caused by a change of surface properties) and delivers event detection data in an Address Event Representation (AER) format that preserves temporal coding.

The event-based vision sensor is deemed beneficial to the above targets, since it acquires and outputs data in a manner that differs completely from traditional frame-based camera sensors. Instead of wastefully sending entire images at fixed frame rates, only the local pixel-level changes that are caused by movement in a scene are transmitted at the time they occur. The result is a stream of events at a microsecond time resolution, which equivalent to or even better than conventional high-speed vision sensors running at thousands of frames per second. Power, data storage and computational requirements are also drastically reduced, and the dynamic sensor range is increased by orders of magnitude, due to the local processing.

An example for an event-based vision sensor is the above-mentioned Silicon Retina. The Silicon Retina is particularly suitable for on-vehicle road surface analysis due to its high dynamic range (over 120 dB), i.e. a low to high light operability. The sensor is able to record stark contrast changes without saturation or underexposure, and is usable in bright sunlight or at nighttime. Further advantages of the Silicon Retina for the system of the present invention are its low power consumption (as low as 23 mW), a minimum latency (15 us), a microsecond time resolution, i.e. a high-speed stimulus without motion blur possible, and a low bandwidth, i.e. only a contrast change event triggers a data transmission. The Silicon Retina delivers a sequential stream of events where the time, direction of event-triggering intensity change (positive or negative), and x and y positions of the event in camera coordinates are reported. This is a paradigm shift from traditional digital cameras (e.g., RGB, YUV cameras) that sense and report images as simultaneous frames.

The Silicon Retina pixel operation is shown in FIG. 1 and is disclosed in US 2008/0135731 A1. An AER pixel is a gain control mechanism that is sensitive to temporal contrast (relative intensity changes). First, photoreceptors respond logarithmically to intensity, then a differencing amplifier removes a DC mismatch, amplifying only changes in intensity. Two comparators monitor the amplifier output and respond to sufficient increases ('ON' state and pixel coordinates emitted) and decreases ('OFF' state and pixel coordinates emitted) in intensity. The differencing amplifier is reset after each event. The amplifier gain reduces the effect of comparator mismatch.

As an alternative to the Silicon Retina, an Asynchronous Time-based Image Sensor (ATIS) camera (see http://www.ait.ac.at) or a Dual Line Sensor (DLS) camera (http://www.ait.ac.at/uploads/media/Datasheet_IVS_DE_V4.1_Print.pdf) could be used as the event-based vision sensor.

Preferably, the processing unit is adapted to integrate the signal provided by the at least one event-based vision sensor to generate an activity map, periodically perform a complex Fourier transformation on the activity map to obtain a plurality of spectra, reorient each spectra to a reference angle, and accumulate the plurality of reoriented spectra to obtain a spectral model for the surface to be traversed by the vehicle. An activity map represents the events (changes in surface properties) of the surface that is monitored by the event-based vision sensor. The activity map allows the use of standard and efficient image processing techniques by integrating the signal of the event-based vision sensor into an activity "image". In this way, a real-time output for a live demo system can be easily obtained. However, the integration of the data stream of the event-based vision sensor into an activity map is not the only possible way for further processing. The data stream from the event-based vision sensor could also be used asynchronously, e.g. via liquid state machines, recurrent neural networks or other non-image based methods.

Preferably, the processing unit is adapted to analyze the monitored surface by correlating the obtained spectral model with a plurality of predetermined spectral models. The processing unit is in this manner adapted to perform an algorithm, which has been specifically developed for the use a Silicon Retina or another event-based vision sensor for surface analysis. The algorithm yields results fast, efficiently and with high confidence. The surface properties can be determined with a high reliability.

The determination of the surface to be traversed by using the above-described spectral analysis is an efficient approach to determine the monitored surface based on the signal of the event-based vision sensor. However, other pattern recognition or learning methods may also be used in combination with the event-based vision sensor.

Preferably, the system is connected to or is integrated with a unit for controlling and/or adjusting parameters of the vehicle, wherein the system is adapted to provide an online closed loop analysis of the surface to be traversed by the vehicle to the control and/or adjustment unit. The system of the present invention can thus achieve that the vehicle never loses traction, which is in contrast required by conventional TCS/ABS systems.

Preferably, the control and/or adjustment unit are adapted to use the results of the system to control the vehicle or to adjust vehicle parameters.

Preferably, the vehicle parameters comprise any combination of parameters concerning engine activation, engine torque, engine ignition timing, engine rpm, engine cylinder activation, vehicle velocity, vehicle trajectory, steering angle, illumination, locks, cruise control, suspension damping, suspension rebound, suspension preload, vehicle ride height, gearing, gear box, transmission, tires, tire pressure, clutch, seat-belts, audio, traction control, launch control, brakes, automatic braking systems, and/or airbags.

Preferably, the event-based vision sensor can be controlled by the processing unit to monitor a surface in a distance in front of the vehicle that is sufficiently large to permit the parameter adjustment before, or up to, the instant the analyzed surface is traversed by the vehicle. The present invention therefore has an advantageous timing.

It can cope with surface events (i.e. adjustments) before the surface is traversed. The distance, in which the surface is monitored is called "look ahead" and is preferably in a range of 0.5 to 2 m, more preferably 1 to 1.5 m.

Preferably, the analysis of the surface comprises a surface type, variation, gradation, irregularities, fluids, ice, snow, surface traction, grip, and/or surface friction and/or surface structure such as potholes, rocks, obstacles, bumps, ruts, ridges, undulation, and/or altitudinal variation.

The invention can further be capable of tailoring for each surface structure or traction event or transition to be or being traversed, vehicle parameters such as vehicle speed, cornering radius, vehicle weight, driver input, etc. For example, if a structure event such as a bump is expected, the suspension preload can automatically be reduced initially, so that the suspension rapidly absorbs the impact as the wheel is pushed upwards by the bump. Then the suspension preload may rapidly increase, so that the wheel is rapidly pushed back down towards the road after the peak of the bump is traversed.

In this manner, the tyre-surface contact may be maximally maintained, increasing vehicle safety and control. Alternatively or simultaneously, the operator may receive a warning that a surface event is about to be traversed such that the operator may manually execute precautionary actions. For example, the driver may be warned if going too fast in a radius and a traction loss is likely, due to the presence of loose gravel on the road.

Preferably, the system is adapted to analyze the surface in front of the vehicle within an angle of 90 degrees to the moving direction of the vehicle. Thus a broad surface area can be monitored, and more surface events can be detected.

Preferably, the system comprises a GPS, an accelerometer, a gyro, a camera, an infrared sensor, a sonar, a laser, a temperature sensor, a humidity sensor and/or a user input device for providing additional information for analyzing the surface to the processing unit. By using other sensors in addition to the event-based vision sensor, the results become even more accurate and reliable.

Preferably, the event-based vision sensor is provided with at least one polarization filter and/or at least one infrared filter. Polarization filters are in particular useful for a surface analysis of water, snow, ice, oil, or other reflective fluids. Only polarized light (i.e. not scattered) is detected.

Preferably, the system is adapted to vary an illumination of the surface monitored by the event-based vision sensor. Controlled lighting can be used to improve the results of the event-based vision sensor.

Preferably, the processing unit is adapted to perform the analysis specifically for surface parts that will actually be contacted by the vehicle. Thus, a specific adjustment for the path of the tire can be made.

Preferably, the system further comprises a unit adapted to present the analysis information to the vehicle operator. The vehicle operator could then adjust parameters manually. In any case he becomes aware of adjustments.

Preferably, the system is mounted onto a motorbike to detect slippery surfaces and to adjust vehicle parameters so that no actual slip occurs. Slip typically occurs where the tire velocity at the tire-surface contact point differs from the vehicle velocity relative to the surface. Tire-surface slip always occurs, but often to a negligible extent.

Preferably, the system is mounted on a car, wherein preferably four of the systems are mounted, one for each wheel of the car, to adjust vehicle parameters so that they are optimally tuned for the analyzed surface. Under the term "optimally" can be understood any quality criteria for the handling of the vehicle, e.g. no slip, maximum torque, etc.

The present invention is further directed to a method for analyzing a surface to be traversed by a vehicle, wherein the method comprises monitoring the surface to be traversed to generate an event-based signal, and analyzing the monitored surface based on the event-based signal.

Preferably, the method further comprises integrating the event-based signal to generate an activity map, periodically performing a complex Fourier transformation on the activity map to obtain a plurality of spectra, reorienting each spectrum to a reference angle, and accumulating the plurality of reoriented spectra to obtain a spectral model for the surface to be traversed by the vehicle.

The method can be extended to have further steps according to the variations of the system described above. The method achieves the same advantages that have been described for the system.

In the following a more detailed description of the invention is presented. In particular the invention explained with reference to the attached drawings.

DETAILS OF THE INVENTION

Figure 1A:
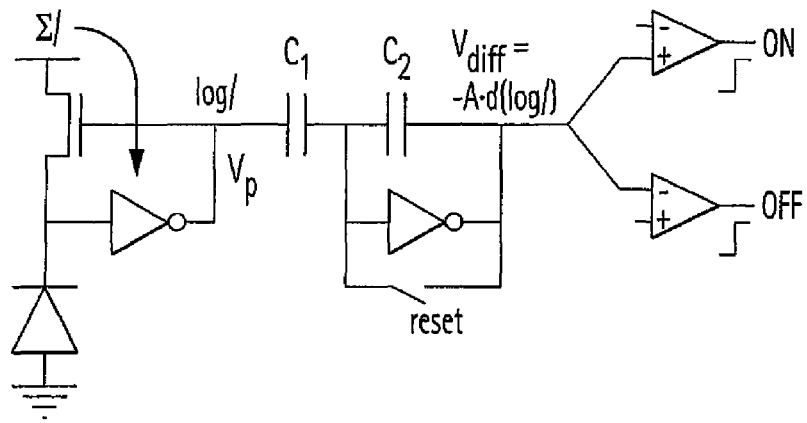
FIG. 1 shows AER pixel cell and its spiking output (taken from US 2008/0135731 A1).
Figure 1B:
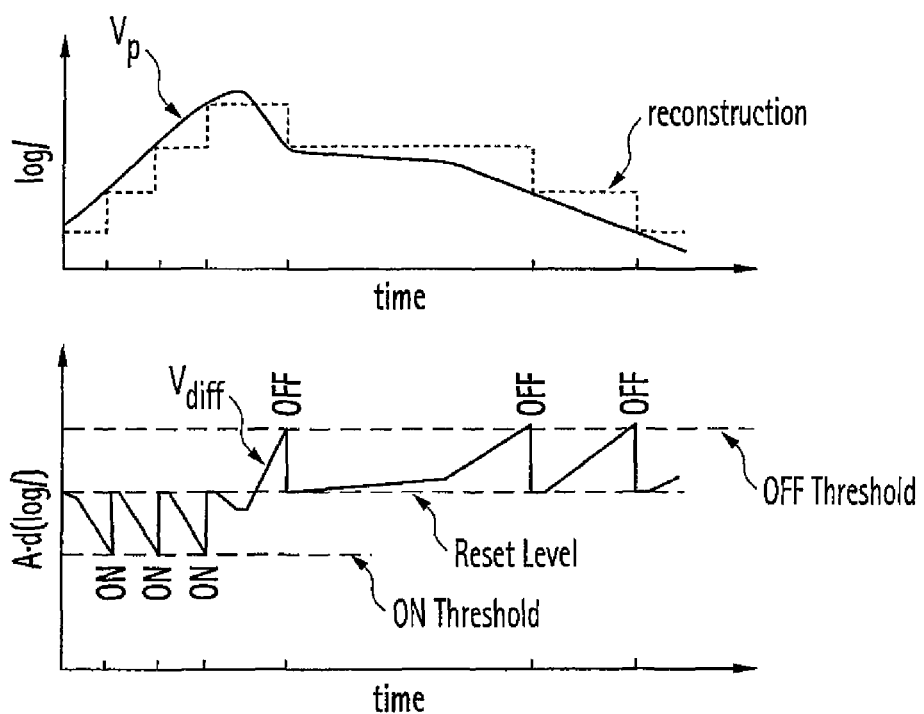
Figure 2:
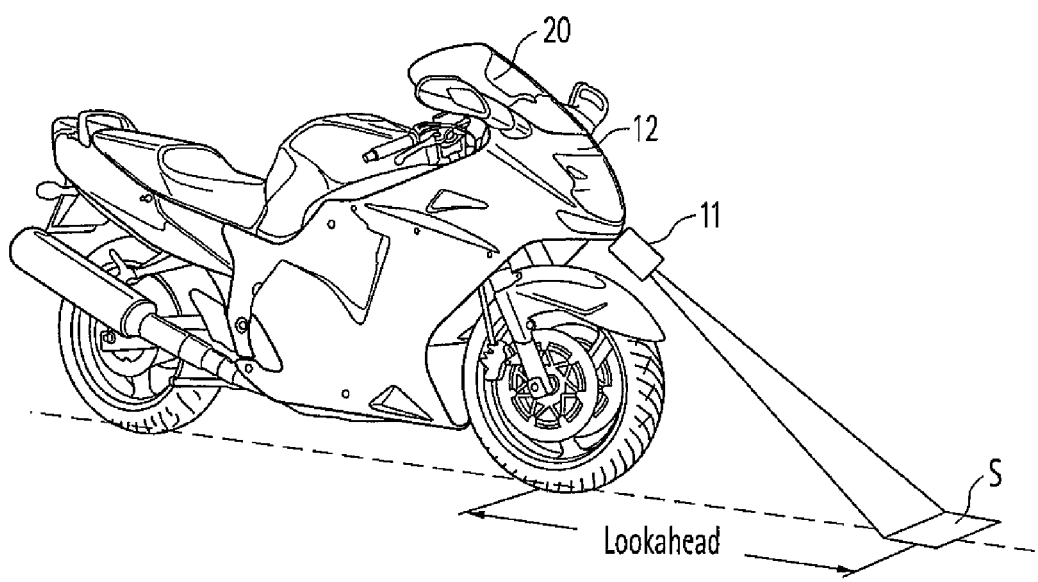
FIG. 2 shows an experimental vehicle used for testing the present invention.

FIG. 2 shows an implementation of the system 10 according to the present invention on a vehicle. A Silicon Retina camera 11 with a 50 mm lens is mounted on the front of a vehicle 20 (in this case a motorcycle platform was utilized, but the camera (in general sensor) 11 could be mounted on any other vehicle type). When the vehicle 20 is driven over various road surfaces the Silicon Retina sensor monitors the surface S to be traversed. The Silicon Retina detects changes of surface properties or the like as events and responds with a signal in the AER format. The signal is processed by a processing unit 12, which is preferably integrated in the vehicle. However, the processing unit 12 can also be provided in the camera 11. In this case the surface S that is monitored is a patch, e.g. 10×10 cm wide and approximately 1-1.5 m distanced ("look ahead") from the front wheel of the motorcycle (in the moving direction). The patch can, however, be also of another size. The system 10 can also be equipped with a sensor 11 that is provided in a camera with a wide-angle lens, so that the event-based sensor 11 is adapted to analyze the surface in front of the vehicle 20 within an angle of 90 degrees to the moving direction of the vehicle.

The AER format is a way of representing data by an ordered sequence of addresses, each of them related to the occurrence of an event. AER was first introduced with the intent of approximating the spike trains, by which neurons communicate. In imaging, conventional frame based representations preserve spatial relations at a simultaneous point in time (actually, averaged over an exposure period). The AER format preserves the temporal continuity of information acquisition by reporting pixel activity individually and asynchronously.

A spectral technique can be used to analyze the surface the vehicle 20 was traversing, e.g. to classify the monitored surface and/or to determine a density of the monitored surface. As an optimal setting, the surface S in a distance of 1.5 m ("look ahead") in front of the vehicle 20 is analyzed. The analysis algorithm developed for the present invention involves two main steps: 1) model training (to set up the system) and 2) surface query (during operation of the vehicle and the system). The algorithm is performed by the processing unit 12.

Figure 3:
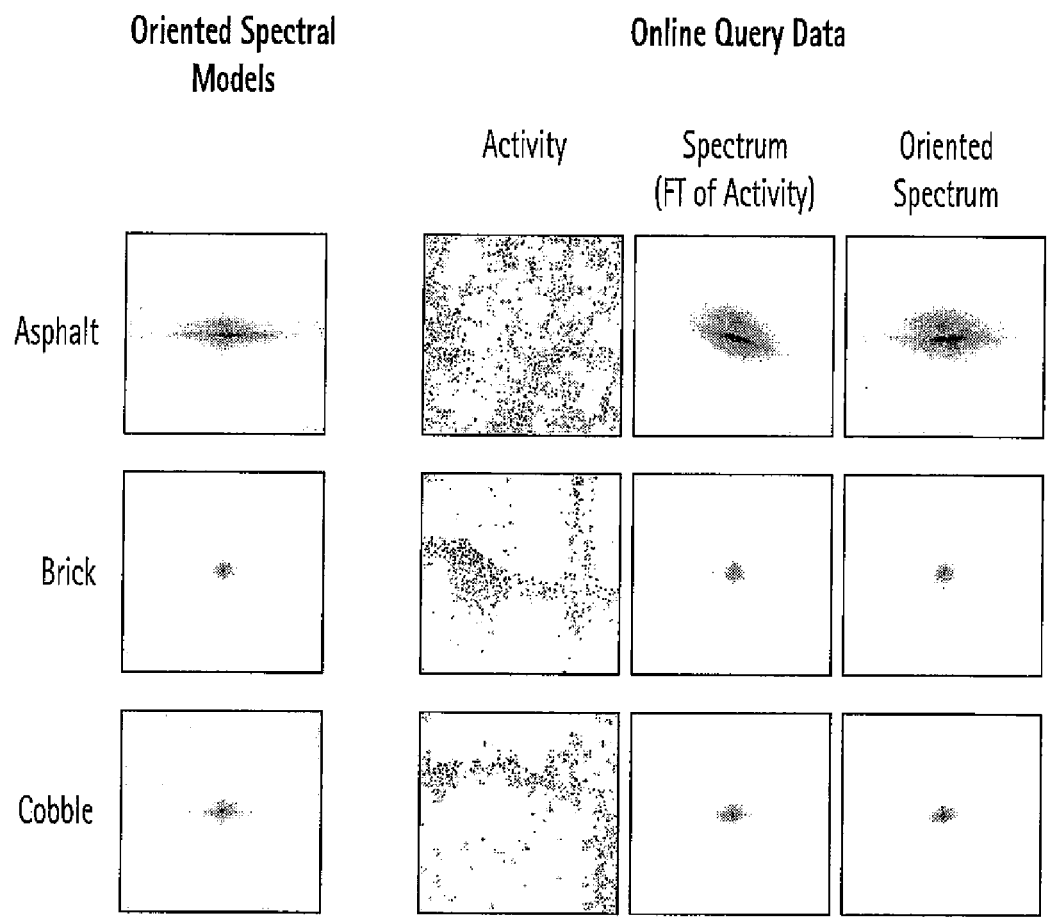
FIG. 3 shows example data from processing stages for 'Tarmac'("Asphalt"), 'Brick' and 'Cobble' surfaces.

For the step of model training, Silicon Retina data is recorded for classes of surfaces S that are later intended to be analyzed. To this end the AER events obtained by the Silicon Retina 11 are integrated by the processing unit 12 into a decaying activity map (see the 'Activity' column in FIG. 3.) The activity map is a representation of the activity, i.e. events caused for example by a change of the surface properties, which is captured by the Silicon Retina sensor 11 in the monitored surface patch S. At regular intervals (preferably every couple of microseconds), a complex 2D Fourier transformation of the activity map is calculated by the processing unit 12. The calculation is performed by using the positive events in the real component and the negative events in the imaginary component (see the 'Spectrum' column in FIG. 3). The obtained spectra are subsequently re-oriented (see the 'Oriented Spectrum' column in FIG. 3) to a reference angle that is determined by using a Hough transform. A dominant line is determined in each spectrum, and each spectrum is rotated, until that dominant line becomes horizontal. This permits a continuous integration (an accumulation into an oriented spectral model) of several oriented spectra over time, regardless of variations in the heading angle of the vehicle 20. The rotation may be implemented by the processing unit 12 as a step for horizontal alignment, or as a rotation of a lesser amount towards the horizontal orientation (this removes the effect of inaccurate reorienting angles as the reorientation angle in reality only varies slowly between successive iterations). After an accumulation of an oriented spectral model of oriented spectra over a few meters of a known surface type, a spectral model is completed (see 'Spectral Model' column in FIG. 3) by the processing unit 12.

The above process is repeated to train individual models for each surface type that is intended to be analyzed. For example, spectral models can be constructed for sand, fine gravel, coarse gravel, leaves, brick, cobble-stone, and asphalt. The spectral models are then stored in the system of the present invention. For example, the processing unit 12 can therefore be equipped with a memory or can be connected to an external memory (not shown).

In the surface query step, i.e. when determining the unknown surface type being traversed by the vehicle 20, the Silicon Retina sensor 11 again monitors a surface patch S. The obtained Silicon Retina events are again continuously integrated by the processing unit 12 into a decaying activity map that represents the monitored surface S. Again, a complex Fourier transform of the activity map is periodically (i.e. every couple of microseconds) computed, oriented, and finally accumulated by the processing unit 12 as described for the model training step above. The accumulation of oriented spectra is conducted over a short history (referred to as "sliding window"). Iteratively the oriented spectra that are accumulated over the short history are correlated with all the known surface type spectral models that are stored in the memory.

The present invention proposes for the correlation of spectra to utilize the Normalised Cross Correlation (NCC). In this case a correlation that yields the strongest response provides an estimate of the surface category. The estimation is conducted by the processing unit 12. The estimation may be also conducted by selecting the instantaneously maximal result, or by more complex means, e.g. by winner-take-all (WTA) networks, temporal smoothing such as low-pass filtering, or by any other form of filtering or selection.

Figure 4:
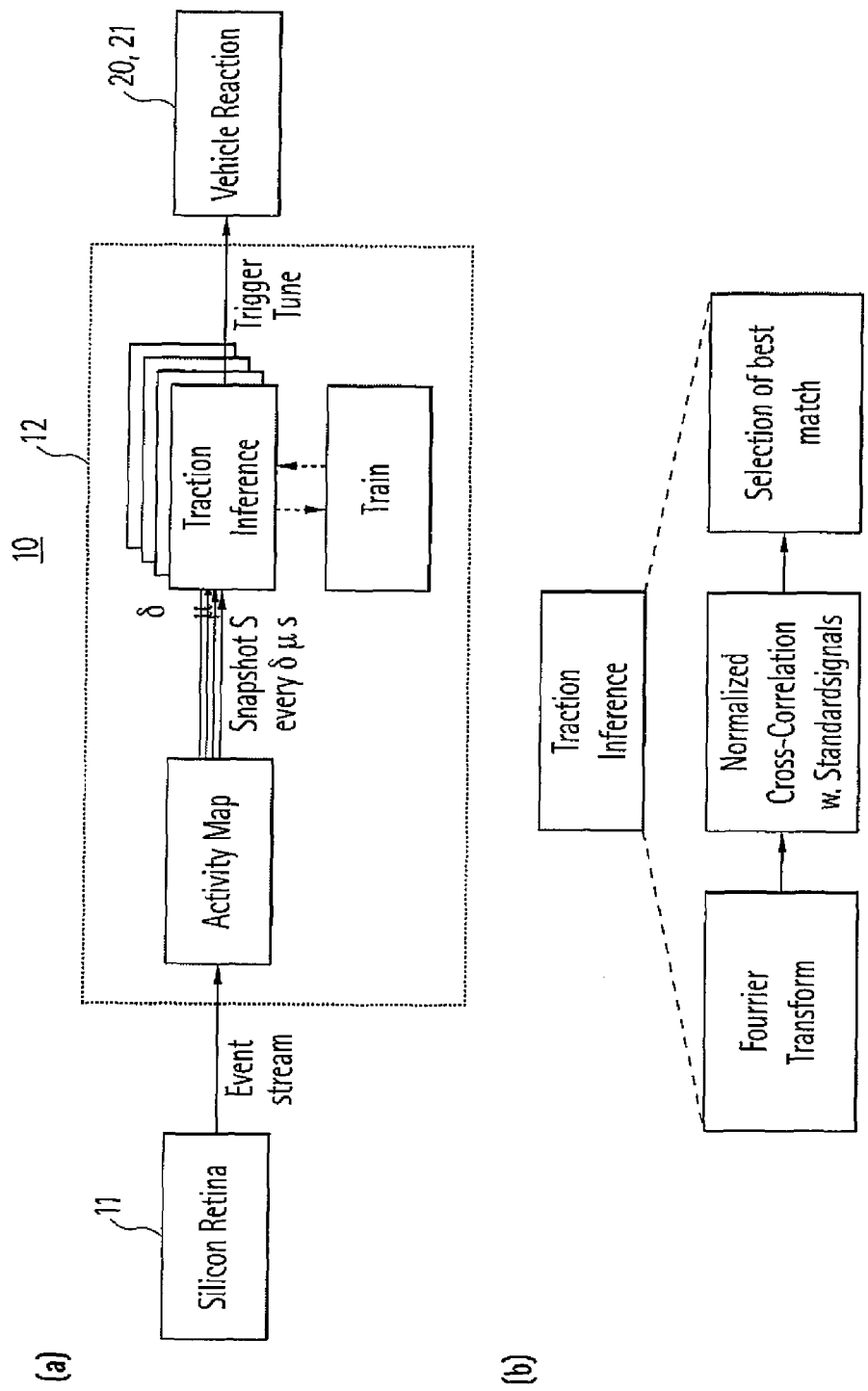
FIG. 4(a) shows a block diagram of a system used to analyze the surface to be traversed.
FIG. 4(b) shows an example of a processing flow inside a "Traction Inference" module.

A flowchart of the above described approach is depicted in FIG. 4, including a possible use of the analysis result for controlling the vehicle or adjusting vehicle parameters (see the rightmost box called vehicle reaction, which represents the control and/or adjustment unit 21, 22). FIG. 4a shows a system that is used to classify a surface to be traversed. The use of the Silicon retina 11 in this application is novel, as are the processing algorithms such as the integration of data into an activity map. Training or learning (see "Train" box) may also be used by the processing unit 12 to benefit from a ground truth estimation by using methods such as e.g. described in http://www.asft.se/. FIG. 4b shows an example of the processing flow inside the "Traction Inference" module. At first a Fourier Transform is performed on the activity map, then NCC is performed, and finally a selection of the best match is made.

Figure 5:
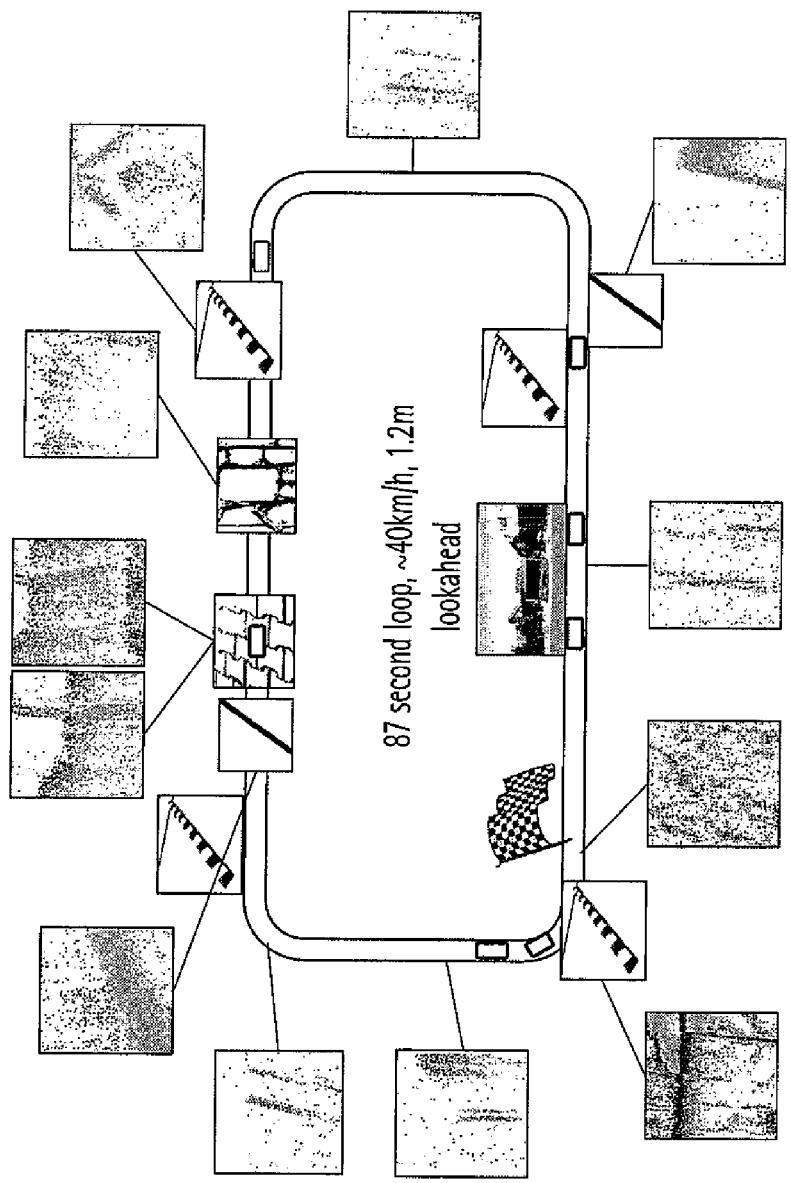
FIG. 5 shows a test course and sample activity maps showing traversed terrain types and Silicon Retina data integrated over a short period of time (100 ms).
Figure 6:
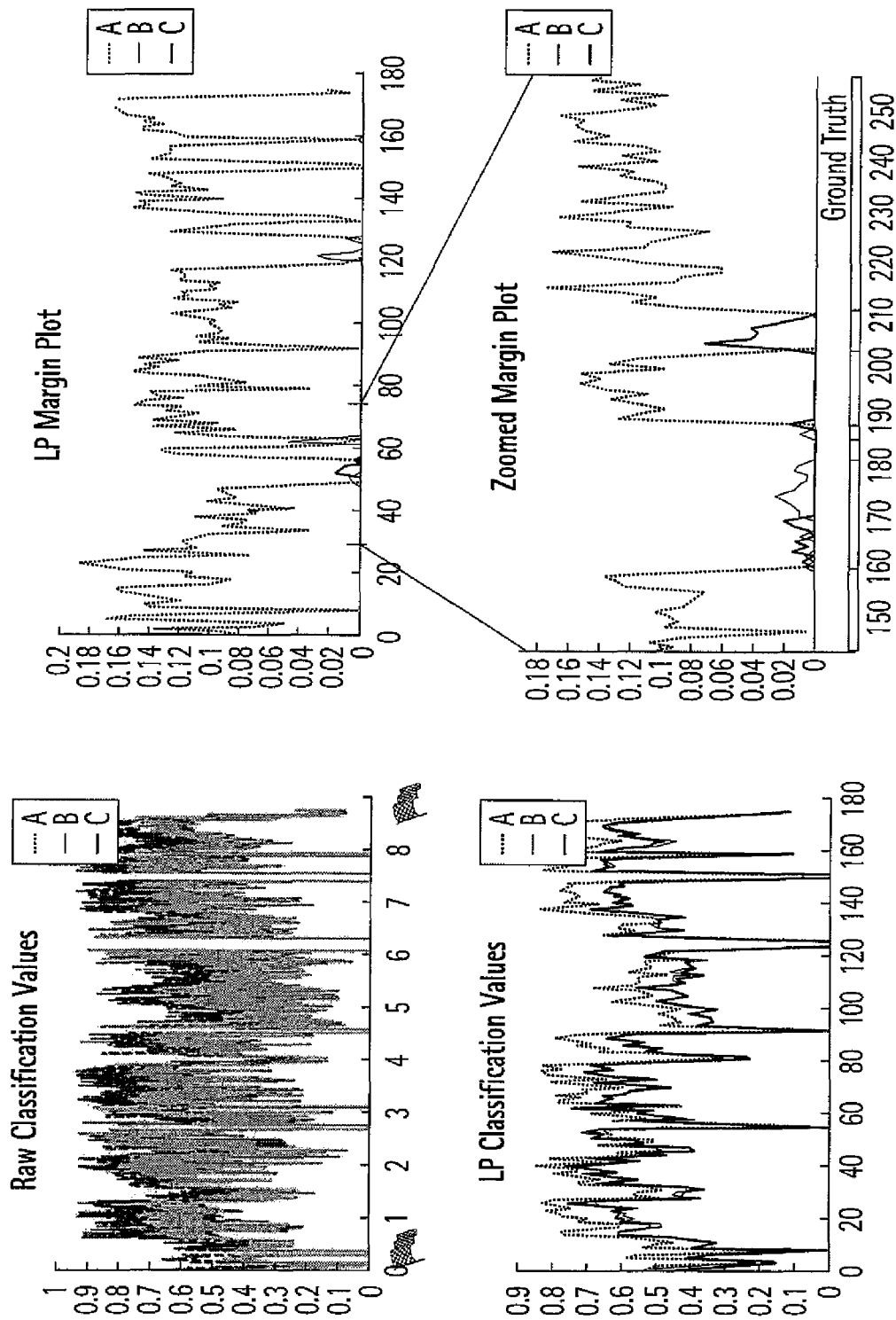
FIG. 6 shows analysis results.

To test the system 10 of the present invention, a test scenario was used as depicted in FIG. 5. Based on the surface types present at the test scenario, for three surface categories spectral models were constructed as described above: for asphalt, brick and cobble. Ground truth data was manually constructed in addition, and was compared to the algorithm's output. FIG. 6 shows data for a raw analysis, low-pass filtered (LP) analysis, a winning margin category of the LP analysis, and a candidate sample of output (zoomed) that was used to evaluate the accuracy of the algorithm against the manually constructed ground truth (see the bar on the lower right side). The sample was selected due to its challenging nature and the inclusion of all three surface categories (A: asphalt, B: brick, C: cobble. The 'Black' category in ground truth indicates lost data). An accuracy of 91.4% was achieved by the algorithm. Where the surface category type does not change in the sample, the performance of the algorithm even approached 100%, due to simplicity of the task and noise reduction inherent in using a low-pass filter.

Figure 7:
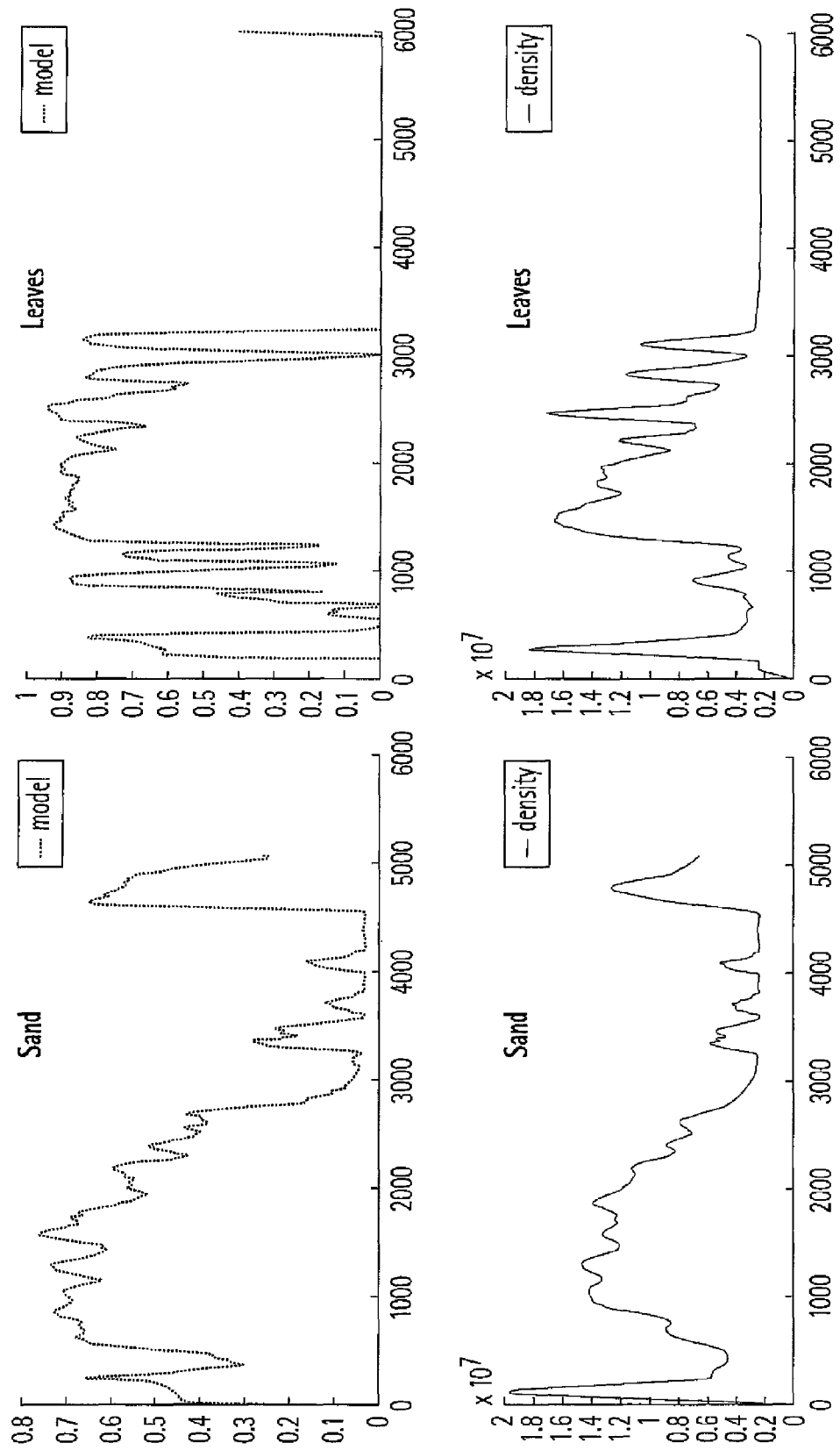
FIG. 7 shows an example of an analysis and density results.

In the above description has been laid out, how a surface can be analyzed. Surface density estimation can be performed with the system of the present invention as well. Surface density estimation is an extension to the above-described surface analysis method. Once the complex spectrum is obtained as described above, the amount of activity in the activity map is an indicator of the density of the analyzed surface. By simply integrating (summing) all values in the activity map, an estimate of a relative density can be obtained. FIG. 7 shows a sample output for a test setup with different surface densities respectively for the expanded algorithm. Four surface hazard types were analyzed at a vehicle speed of over 40 km/h: sand on asphalt, fine gravel on asphalt, coarse gravel on asphalt, and leaves on asphalt. In FIG. 7 on the left side results for "sand on asphalt" are shown, and on the right side results for "leaves on asphalt are shown". The top diagrams show the analysis value and the low diagrams show a relative texture density.

Figure 8:
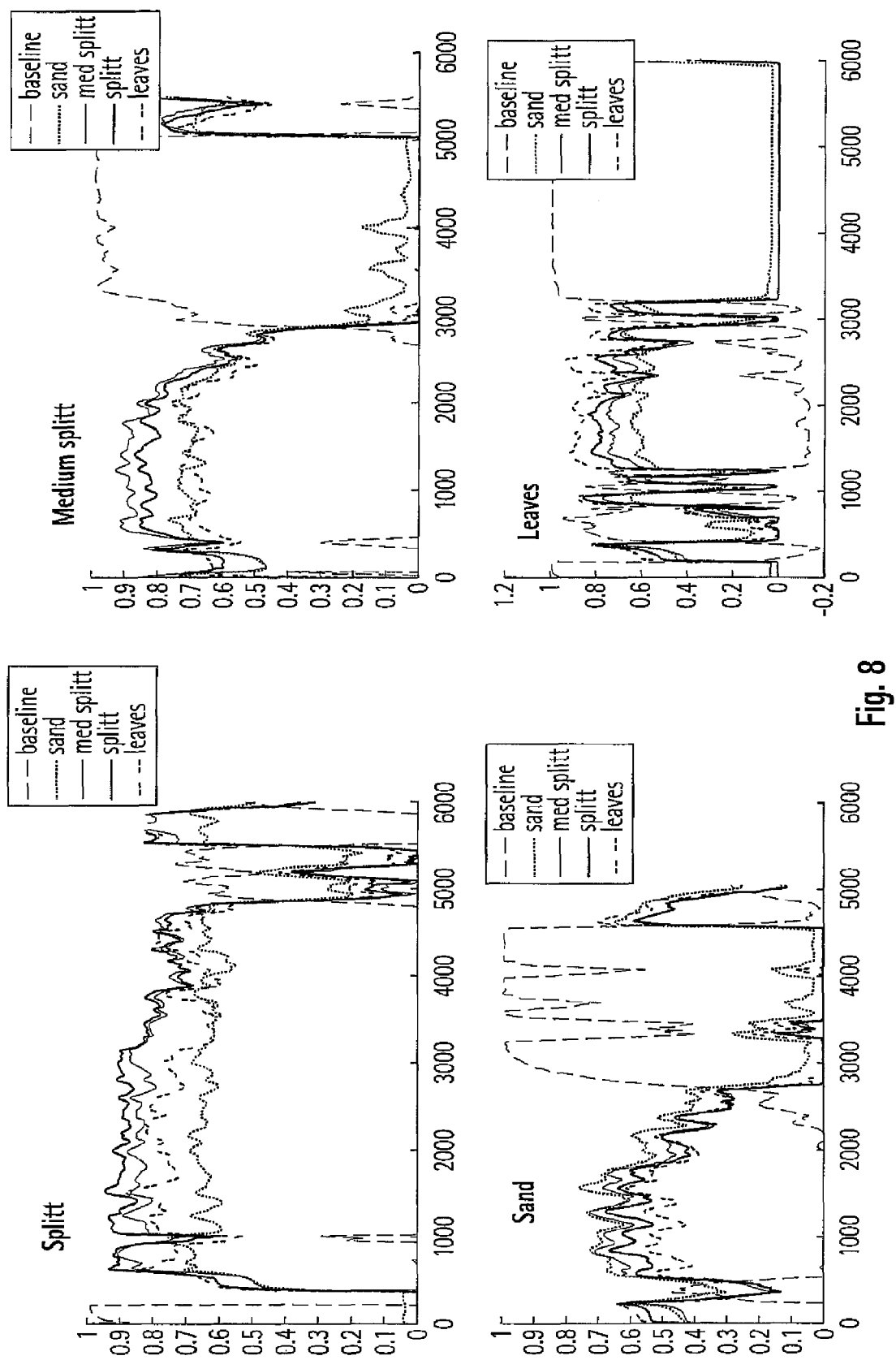
FIG. 8 shows analysis results.

To demonstrate an analysis performance, like a classification performance, and that such a classification is strongly independent from the density, all four model responses were determined for all four test inputs. FIG. 8 demonstrates that when the test vehicle 20 was driven over each of the hazard types, the correct filter elicited the strongest response. For example, in the top left of FIG. 8, when the vehicle 20 was driven over the 'splitt' (coarse gravel on asphalt) hazard, the splitt spectral model correctly elicited the strongest filter response (red line). Despite its physically similar appearance to splitt, the 'medium splitt' (fine gravel on asphalt) filter correctly elicited the strongest response when driven over that hazard type (top right, green line). The same trend is apparent for all four surface hazard classes (also for the sand on asphalt and leaves on asphalt cases). A snapshot from the real-time output obtained in this experiment that shows classification and density results is provided in FIG. 9.

Figure 9:
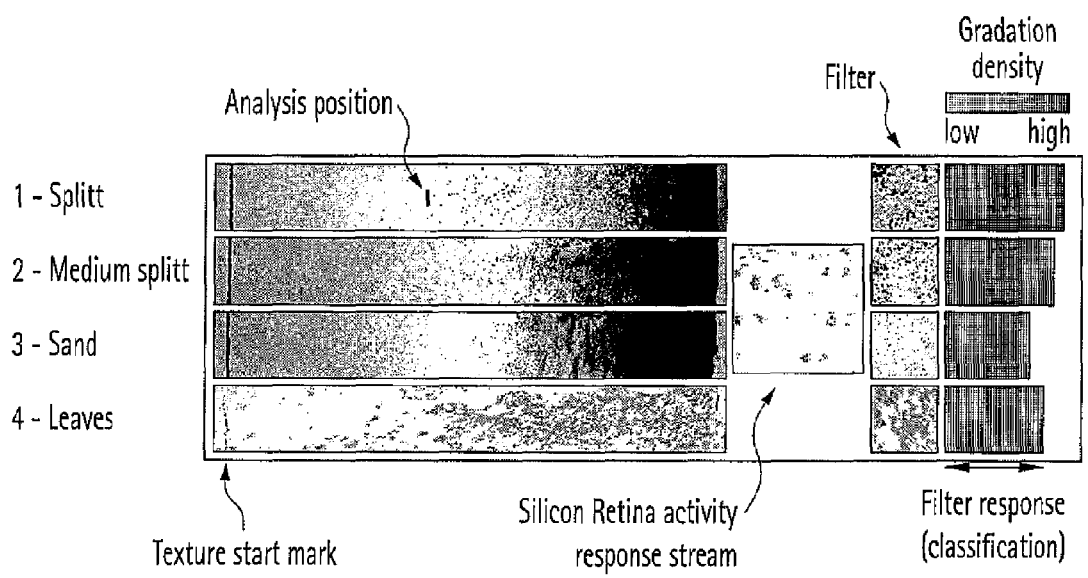
FIG. 9 shows a sample output snapshot from a results summary movie for an analysis with a density measurement.

In FIG. 9 the vehicle 20 moved from left to the right over each of the four terrains mentioned above. The Silicon Retina output is shown in the middle grey square box (Silicon Retina activity response stream). The output of the algorithm is shown on the right side indicating that the present terrain in front of the vehicle (at the 'analysis position') elicits the highest response from the "splitt" filter (indicated by width of filter response bar), and that the splitt at the analysis position is of medium density (indicated by the color in respect to the color coding).

Also the road surface structure can be analyzed with the system of the present invention. Multiple views of a scene or an object, for example as commonly done with conventional stereo cameras, can provide information pertaining to specific scene structures. Depth maps, for example, are commonly computed from pairs of CCD/CMOS conventional camera images. In a similar manner, and though the algorithms differ, two or more Silicon Retinas 11a, 11b can facilitate a structural analysis. The Silicon Retina 11 has been used in a stereo sensor format as described above, but it has not yet been used for traversed surface analysis.

A stereo Silicon Retina method to obtain a structure by analyzing the horizontal offset (disparity) of simultaneously firing left and right events in the camera streams and by using a Markov Random Field (MRF) framework has been implemented by the inventors.

Figure 10:
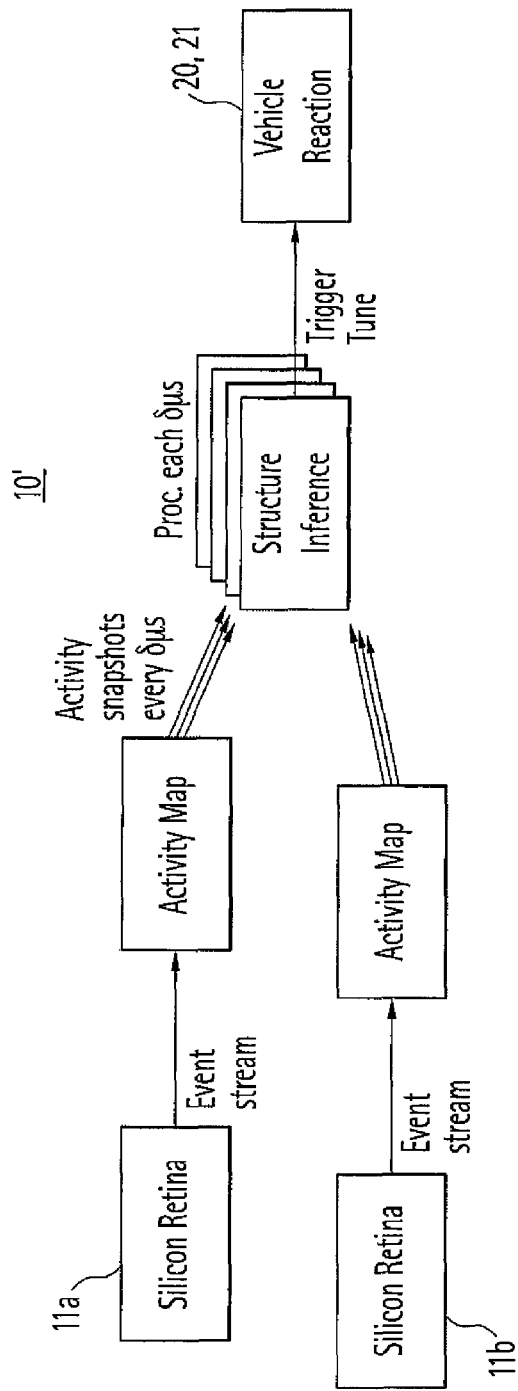
FIG. 10 shows a block diagram of a system for analyzing a structure, the system incorporating two or more Silicon Retina cameras.

FIG. 10 shows a system 10' that demonstrates how to analyze surface structure, namely by incorporating two or more Silicon Retina cameras 11a, 11b for vehicle control (vehicle reaction). Activity maps of each event stream of each Silicon Retina cameras 11a, 11b are obtained and may be synchronized. A process of "structure inference" may involve an online and/or offline training.

Further, polarization can be used to analyze surfaces for fluids, ice, or snow. The extent to which reflected light polarizes depends on the surface material, and the angle under which light approaches the surface (see FIG. 11). Asphalt roads, snow, water, and oil on surfaces reflect light with large concentrations of vibrations parallel to reflecting surface (polarized). Polarized lenses can be used with the Silicon Retina camera 11 to detect polarized reflections, and infer properties of a surface to be traversed. Polarization techniques are commonly used with traditional cameras but have not previously been used in combination with a Silicon Retina or any AER camera before. Polarization lenses may be used with the Silicon Retina 11 to facilitate fluid analysis in this manner.

Figure 11:
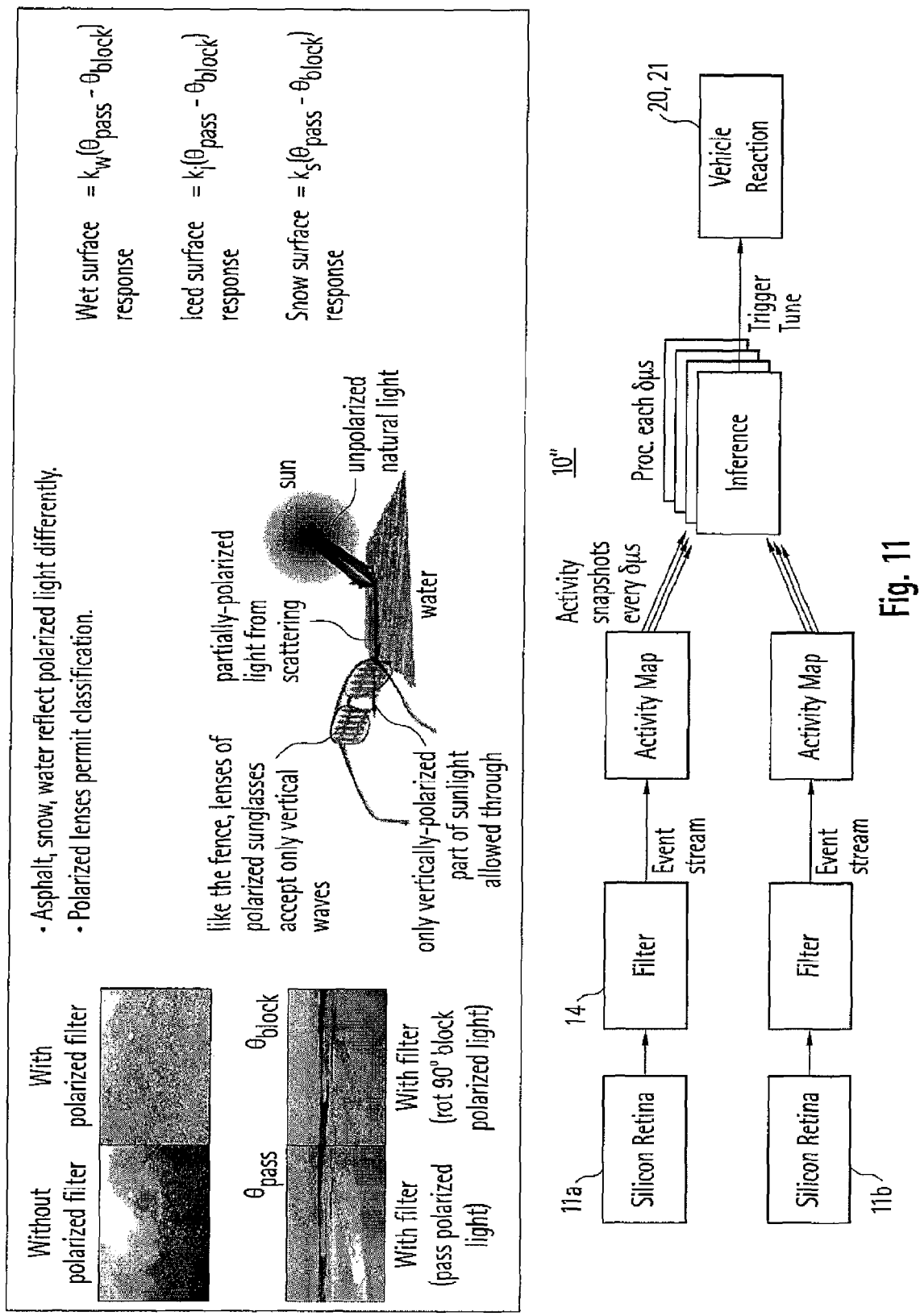
FIG. 11 shows a system for filtering the analysis (pictures taken from Wikipedia).

A flow chart that describes how the above can be achieved is depicted in FIG. 11. FIG. 11 presents a system 10" for performing a filtering analysis (e.g. polarization). The system 10" incorporates one, two (shown), or more Silicon Retina cameras 11a, 11b. For example, for a fluid, ice, or snow analysis used for a vehicle reaction (in this case a traction control), a first filter 13 is oriented to pass polarized light, and second filter 13 is oriented to block polarized light. Activity maps of each event stream of each Silicon Retina 11a, 11b may be synchronized. Other filters and/or lenses may be used singularly or in combination, for example IR filters 14 or zoom lenses etc. These concepts have been applied to fluid/snow analysis previously, but have not been used with the Silicon Retina. The use of the Silicon Retina 11 in this application is novel as are necessarily the processing algorithms such as the integration of data into an activity map.

The invention claimed is:

1. System for analyzing a surface to be traversed by a vehicle, wherein the system comprises:
   at least one event-based vision sensor for monitoring the surface to be traversed; and
   a processing unit for analyzing the monitored surface based on a signal provided by the at least one event-based vision sensor,
   wherein the processing unit is adapted to integrate the signal provided by the at least one event-based vision sensor to generate an activity map.

2. System according to claim 1, wherein the processing unit is further adapted to:
   periodically perform a complex Fourier transformation on the activity map to obtain a plurality of spectra;
   reorient each spectra to a reference angle; and
   accumulate the plurality of reoriented spectra to obtain a spectral model for the surface to be traversed by the vehicle.

3. System according to claim 2, wherein the processing unit is adapted to analyze the monitored surface by correlating the obtained spectral model with a plurality of predetermined spectral models.

4. System according to claim 1, wherein the processing unit is adapted to use the signal provided by the at least one event-based vision sensor asynchronously via a liquid state machine, a recurrent neural network or other non-image based techniques.

5. System according to claim 1,
   wherein the system is connected to or is integrated with a unit for controlling or adjusting parameters of the vehicle, and
   wherein the system is adapted to provide an online closed loop analysis of the surface to be traversed by the vehicle to the control or adjustment unit.

6. System according to claim 5, wherein the control or adjustment unit are adapted to use the results of the system to control the vehicle or to adjust vehicle parameters.

7. System according to claim 6, wherein the vehicle parameters comprise any combination of parameters concerning engine activation, engine torque, engine ignition timing, engine rpm, engine cylinder activation, vehicle velocity, vehicle trajectory, steering angle, illumination, locks, cruise control, suspension damping, suspension rebound, suspension preload, vehicle ride height, gearing, gear box, transmission, tires, tire pressure, clutch, seat-belts, audio, traction control, launch control, brakes, automatic braking systems, and/or airbags.

8. System according to claim 5, wherein the event-based vision sensor can be controlled by the processing unit to monitor a surface in a distance in front of the vehicle that is sufficiently large to permit the parameter adjustment before, or up to, the instant the analyzed surface is traversed by the vehicle.

9. System according to claim 1, wherein the analysis of the surface comprises a surface type, variation, gradation, irregularities, fluids, ice, snow, surface traction, grip, or surface friction and/or surface structure such as potholes, rocks, obstacles, bumps, ruts, ridges, undulation, or altitudinal variation.

10. System according to claim 1, wherein the system is adapted to analyze the surface in front of the vehicle within an angle of 90 degrees to the moving direction of the vehicle.

11. System according to claim 1, wherein the system comprises a GPS, an accelerometer, a gyro, a camera, an infrared sensor, a sonar, a laser, a temperature sensor, a humidity sensor or a user input device for providing additional information used for analyzing the surface to the processing unit.

12. System according to claim 1, wherein the event-based vision sensor is provided with at least one polarization filter or at least one infrared filter.

13. System according to claim 1, wherein the system is adapted to vary an illumination of the surface monitored by the event-based vision sensor.

14. System according to claim 1, wherein the processing unit is adapted to perform the analysis specifically for surface parts that will actually be contacted by the vehicle.

15. System according to claim 1, further comprising a unit adapted to present the analysis information to the vehicle operator.

16. System according to claim 1, wherein the vehicle is a motorbike, and the system is mounted onto the motorbike to detect slippery surfaces and to adjust vehicle parameters so that no actual slip occurs.

17. System according to claim 1, wherein the vehicle is a car, and wherein four of the systems are mounted on the car, one for each wheel of the car, to adjust vehicle parameters so that they are optimally tuned for the analyzed surface.

18. Vehicle comprising a system for analyzing a surface to be traversed by a vehicle, wherein the system comprises:
    at least one event-based vision sensor for monitoring the surface to be traversed; and
    a processing unit for analyzing the monitored surface based on a signal provided by the at least one event-based vision sensor,
    wherein the processing unit is adapted to integrate the signal provided by the at least one event-based vision sensor to generate an activity map.

19. Method for analyzing a surface to be traversed by a vehicle, wherein the method comprises:
    monitoring, by at least one event-based vision sensor, the surface to be traversed to generate an event-based signal: and
    analyzing the monitored surface based on the event-based signal,
    wherein the method further comprises
    integrating the event-based signal to generate an activity map.

20. Method according to claim 19, further comprising:
    periodically performing a complex Fourier transformation on the activity map to obtain a plurality of spectra;
    reorienting each spectra to a reference angle; and
    accumulating the plurality of reoriented spectra to obtain a spectral model for the surface to be traversed by the vehicle.

21. Method according to claim 19, wherein depending on the analysis one or more of the following actions are triggered:
    control an actuator of the vehicle,
    indicate the result of the analysis visually, haptically or acoustically, or
    adjust parameters of the vehicle.

22. Computer software program product implementing a method for analyzing a surface to be traversed by a vehicle when run on a computing device of the vehicle, the method comprising:
    monitoring, by at least one event-based vision sensor, the surface to be traversed to generate an event-based signal: and
    analyzing the monitored surface based on the event-based signal,
    wherein the method further comprises
    integrating the event-based signal to generate an activity map.

* * * * *